United States Patent
Shulman et al.

(10) Patent No.: US 9,275,291 B2
(45) Date of Patent: Mar. 1, 2016

(54) SYSTEM AND METHOD OF CLASSIFIER RANKING FOR INCORPORATION INTO ENHANCED MACHINE LEARNING

(71) Applicant: Texifter, LLC, Amherst, MA (US)

(72) Inventors: Stuart William Shulman, Amherst, MA (US); Mark James Hoy, Amherst, MA (US)

(73) Assignee: TEXIFTER, LLC, Amherst, MA (US)

( * ) Notice: Subject to any disclaimer, the term of this patent is extended or adjusted under 35 U.S.C. 154(b) by 112 days.

(21) Appl. No.: 13/919,937

(22) Filed: Jun. 17, 2013

(65) Prior Publication Data

US 2014/0369597 A1 Dec. 18, 2014

(51) Int. Cl.
G06K 9/62 (2006.01)
G06K 9/03 (2006.01)

(52) U.S. Cl.
CPC ............ *G06K 9/033* (2013.01); *G06K 9/6254* (2013.01); *G06K 9/6263* (2013.01)

(58) Field of Classification Search
CPC .... G06K 9/6254; G06K 9/033; G06K 9/6263
See application file for complete search history.

(56) References Cited

U.S. PATENT DOCUMENTS

| | | | |
|---|---|---|---|
| 6,609,124 B2 | 8/2003 | Chow et al. | |
| 6,691,122 B1 | 2/2004 | Witte et al. | |
| 6,829,613 B1 | 12/2004 | Liddy | |
| 7,287,012 B2 | 10/2007 | Corston et al. | |
| 7,426,497 B2 | 9/2008 | Bacioiu et al. | |
| 7,461,051 B2 | 12/2008 | Lavine | |
| 7,593,904 B1 | 9/2009 | Kirshenbaum et al. | |
| 7,747,555 B2 | 6/2010 | Regier et al. | |
| 7,756,800 B2 | 7/2010 | Chidlovski | |
| 7,840,521 B2 | 11/2010 | Aoki | |
| 7,958,067 B2 | 6/2011 | Schmidtler et al. | |
| 7,971,150 B2 | 6/2011 | Raskutti et al. | |
| 7,974,940 B2 | 7/2011 | Ayloo | |
| 8,027,941 B2 | 9/2011 | Probst et al. | |
| 8,131,684 B2 | 3/2012 | Wrabetz et al. | |
| 8,135,710 B2 | 3/2012 | Summerlin et al. | |
| 8,165,974 B2 | 4/2012 | Privault et al. | |
| 8,175,377 B2 | 5/2012 | Moore et al. | |
| 8,296,301 B2 | 10/2012 | Lunde | |
| 2005/0223354 A1* | 10/2005 | Drissi .................. G06F 8/36 717/114 |
| 2007/0168946 A1* | 7/2007 | Drissi et al. ................ 717/110 |
| 2009/0182758 A1* | 7/2009 | Lotlikar et al. ............. 707/102 |

OTHER PUBLICATIONS

Coding Analysis Toolkit, Loading and Coding Raw Data in CAT, https://web.archive.org/web/20121231152729/http:/www.screencast.com/t/pvzmAaz, Shulman, Stuart, WayBackMachine Archive date of Dec. 31, 2012.*

(Continued)

*Primary Examiner* — Utpal Shah
*Assistant Examiner* — Pinalben Patel
(74) *Attorney, Agent, or Firm* — Knobbe Martens Olson & Bear LLP

(57) ABSTRACT

Systems and methods are disclosed for machine classifiers that employ enhanced machine learning. The machine classification may be automated, based on the input of human classifiers, or a combination of both. The selection of human classifiers is determined by a classifier ranking or scoring process. In addition, data generated by the ranking or scoring process can be used to train the machine classifiers to more accurately classify data.

26 Claims, 12 Drawing Sheets

(56) References Cited

OTHER PUBLICATIONS

Hui Yang & Jamie Callan, "Ontology Generation for Large Email Collections," Proceedings of the Ninth International Conference on Digital Government Research, May 18-21, 2008 (Digital Government Research Center).

Stuart W. Shulman, Eduard Hovy, Namhee Kwon & Emily Huisman, Tools for Rules: Technology Transfer and Electronic Rulemaking, presented at HICSS-41 the Hawaii International Conference on System Science, Waikoloa, Hawaii.

Nahmee Kwon, Eduard Hovy, and Stuart Shulman, Identifying and Classifying Subjective Claims, Proceedings of the Eighth National Conference on Digital Government Research, May 20-23, 2007 (Digital Government Research Center).

Stuart Shulman, Jamie Callan, Eduard Hovy, and Stephen Zavestoski, Progress in Language Processing Technology for Electronic Rulemaking: A Project Highlight, Proceedings of the Seventh National Conference on Digital Government Research, May 21-24, 2006 (Digital Government Research Center).

Namhee Kwon, Stuart Shulman, and Eduard Hovy, Multidimensional Text Analysis for eRulemaking, Proceedings of the Seventh National Conference on Digital Government Research, May 21-24, 2006 (Digital Government Research Center).

Grace Hui Yang, Jamie Callan, and Stuart Shulman, Next Steps in Near Duplicate Detection for eRulemaking, Proceedings of the Seventh National Conference on Digital Government Research, May 21-24, 2006 (Digital Government Research Center).

Stuart Shulman, Jamie Callan, Eduard Hovy, and Stephen Zavestoski, Language Processing Technology for Electronic Rulemaking: A Project Highlight, Proceedings of the Sixth National Conference on Digital Government Research, May 15-18, 2005 (Digital Government Research Center).

Hui Yang & Jamie Callan, "Near-Duplicate Detection for eRulemaking," Proceedings of the Sixth National Conference on Digital Government Research, May 15-18, 2005 (Digital Government Research Center).

Stuart Shulman, Jamie Callan, Eduard Hovy, and Stephen Zavestoski, Sger Collaborative: A Testbed for eRulemaking Data, Proceedings of the Fifth National Conference on Digital Government Research, May 24-26, 2004 (Digital Government Research Center).

Chi-Jung Lu and Stuart W. Shulman, "Rigor and Flexibility on Computer-based qualitative Research: Introducing the Coding Analysis Toolkit," International Journal of Multiple Research Approaches vol. 2, No. 1 (2008), 105-117.

Coding Analysis Toolkit Help Wiki [online] [retrieved on Mar. 25, 2014], retrieved from Internet, 25 pages. http://cat-help.qdap.net/MainPage.ashx/overview.ashx/Getting%20started.ashx/Creating%20Sub-Accounts.ashx/Prepare%20Data.ashx/Prepare%Codelist.ashx/Loading%20Data.ashx/Coding%20Styles.ashx/Assigning%20Coder.ashx/Coding.ashx/Memos.ashx/Comparisons.ashx/Adjudication.ashx/Reports.ashx/Ideas-for-CAT-Improvements.ashx/Cat-Help-Wiki-toDo-List.ashx.

CAT Coding Analysis Toolkit [online] [retrieved on Apr. 8, 2014], retrieved from Internet, 13 pages. http://catucsur.pitt.edu/aboutQDAP.aspx/blog.texifter.com/terms.aspx/privacy.aspx/contact.aspx.

* cited by examiner

Total Valid Answers: 416 / 429 (96.97%)

Validation by Coder

| Coder | Valid Answers |
|---|---|
| Coder #1 | 96 / 100 (96.00%) |
| Coder #2 | 27 / 29 (93.10%) |
| Coder #3 | 98 / 100 (98.00%) |
| Coder #4 | 96 / 100 (96.00%) |
| Coder #5 | 99 / 100 (99.00%) |

800

Validations by Class:

| Target | 22/27 (81.15%) |
|---|---|
| not Target | 391 / 397 (98.49%) |

Standard Comparisons

Dataset details > Standard Comparisons

Dataset: TargetTest Fulltext >90 v2a

Perform another comparison

Current view: Comparison Table ▼

| Code | Coder #1 | Coder #2 | Coder #3 | Coder #4 | Coder #5 | Exact Match | Partial Match | Kappa |
|---|---|---|---|---|---|---|---|---|
| Target | 8 | 5 | 5 | 8 | 5 | 4 | 3 | 0.72 |
| not Target | 92 | 24 | 95 | 92 | 95 | 90 | 5 | 0.97 |
| Totals | 100 | 29 | 100 | 100 | 100 | 94 | 8 | 0.95 |

Download as RTF

FIG. 9

SYSTEM AND METHOD OF CLASSIFIER RANKING FOR INCORPORATION INTO ENHANCED MACHINE LEARNING

FIELD OF THE INVENTION

This application relates generally to data mining and text analytics. In particular, it relates to the use of machine classifiers which employ learning algorithms that analyze data and recognize patterns that can be used for classification and analysis.

SUMMARY OF THE DISCLOSURE

The systems and methods generally relate to enhanced machine learning for machine classifiers which incorporates user ranking data into the learning process. In one embodiment, a plurality of data sets, including a first data set and at least one training data set, are stored in a first physical data store. A second physical data store is configured to store coder data related to users who perform data coding. The first and second physical data stores electronically communicate with a classification computer module. The classification computer module is configured to store a first set of selected codes corresponding to a set of data items in a training data set of the first data set. A first set of selected codes can be provided by a first user through a first classifier system. A second set of selected codes can be provided by a second user through a second classifier system. The first set of selected codes is different from the second set of selected codes. The selected codes can be adjudicated by a third user. These adjudicated selected codes can then be electronically accessed or stored. Based on the adjudication process, a trust score corresponding to each user can be calculated for each of the first and second users. These trust scores are then stored in a physical data store for use in the enhanced machine learning process. In another embodiment, a computer-implemented method of enhanced machine learning using coder rankings is disclosed. The method may include, under control of one or more computing devices configured with specific computer executable instructions, storing a first set of selected codes corresponding to a set of data items in a training data set of a first data set, the first set of selected codes provided by a first user via a first classifier system; storing a second set of selected codes corresponding to the set of data items, the second set of selected codes provided by a second user via a second classifier system, wherein the first set of selected codes is different from the second set of selected codes; electronically accessing an adjudicated set of selected codes adjudicated by a third user via an adjudication system; generating a first trust score corresponding to the first user, the first trust score based at least in part on an accuracy determination of the first set of selected codes as compared to the adjudicated set of selected codes; generating a second trust score corresponding to the second user, the second trust score based at least in part on an accuracy determination of the second set of selected codes as compared to the adjudicated set of selected codes, wherein the accuracy determination of the first set of selected codes indicates a level of accuracy higher than the accuracy determination of the second set of selected codes and the first trust score corresponding to the first user is higher than the second trust score corresponding to the second user; and storing the first trust score and the second trust score in the second physical data store. In another embodiment, a non-transitory computer storage having stored thereon a computer program that instructs a computer system is disclosed. The computer program may instruct the computer system to store a first set of selected codes corresponding to a set of data items in a training data set of a first data set, the first set of selected codes provided by a first user via a first classifier system; store a second set of selected codes corresponding to the set of data items, the second set of selected codes provided by a second user via a second classifier system, wherein the first set of selected codes is different from the second set of selected codes; electronically accessing an adjudicated set of selected codes adjudicated by a third user via an adjudication system; and generate a first trust score corresponding to the first user, the first trust score based at least in part on an accuracy determination of the first set of selected codes as compared to the adjudicated set of selected codes; generate a second trust score corresponding to the second user, the second trust score based at least in part on an accuracy determination of the second set of selected codes as compared to the adjudicated set of selected codes; wherein the accuracy determination of the first set of selected codes indicates a level of accuracy higher than the accuracy determination of the second set of selected codes and the first trust score corresponding to the first user is higher than the second trust score corresponding to the second user; and store the first trust score and the second trust score in the second physical data store.

BRIEF DESCRIPTION OF THE DRAWINGS

FIG. 8 is one embodiment of an illustrative webpage user interface that includes a report depicting the validation results of selected coders after their selected codes have been adjudicated.

FIG. 9 is one embodiment of an illustrative webpage user interface that includes the standard comparisons of an analyzed data set.

DETAILED DESCRIPTION OF PREFERRED EMBODIMENTS

Figure 1:
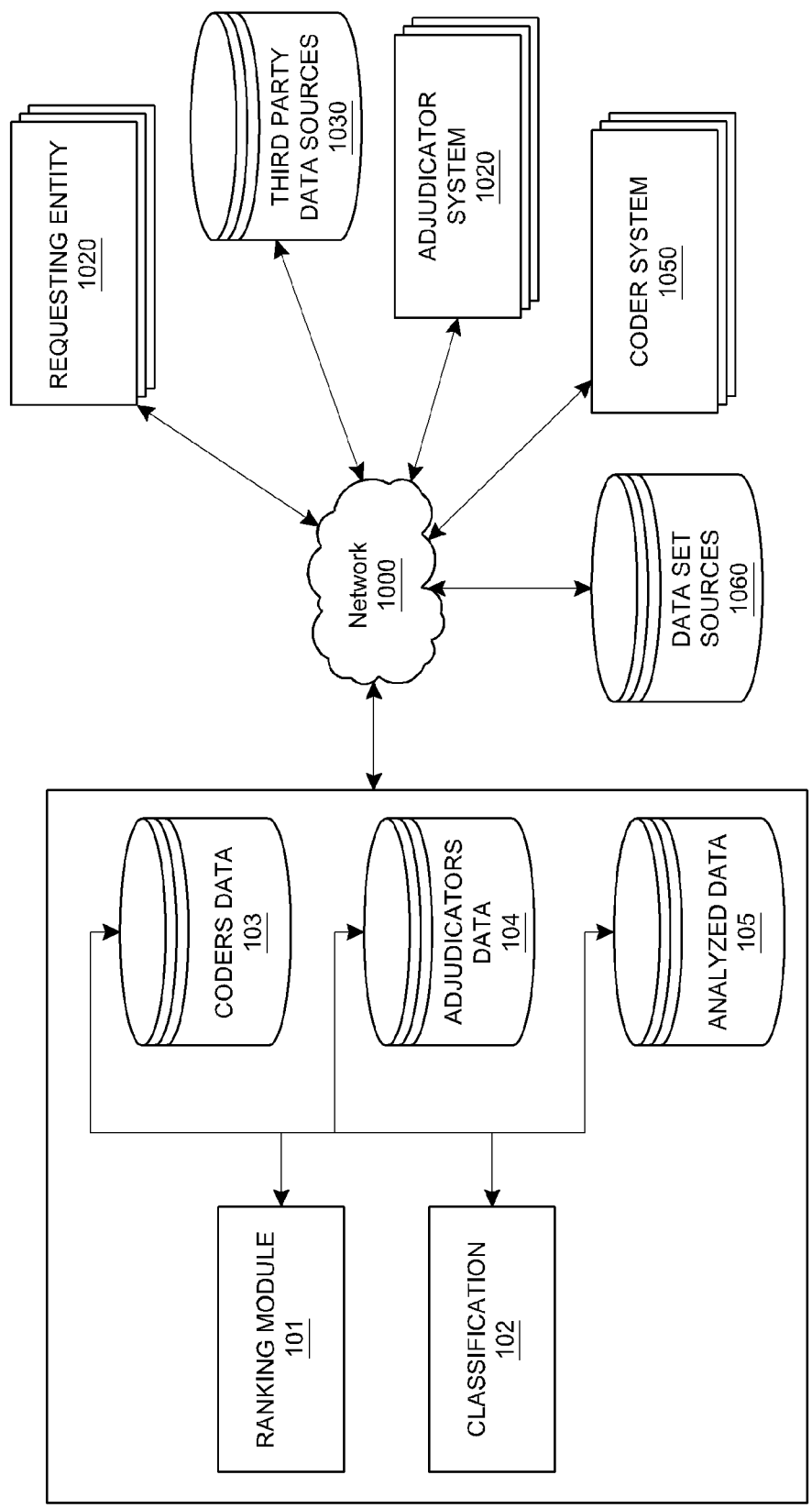
FIG. 1 is a block diagram illustrating one embodiment of an enhanced machine learning system in communication with a network and various systems which are also in communication with the network.

The increase in the amount of large sets of data has created a need for the ability to timely and accurately analyze large data sets and provide meaningful information about the content of each data set. One approach to analyzing the data is to categorize or classify the data into distinct groups. Machine classifiers have been enlisted to help automate the classification process, and techniques such as Bayesian classification have been used. However, given the rapid growth in the size and the diversity of the data sets, traditional machine classification techniques have fallen short. Accordingly, there is a need to improve machine classification systems and processes that are currently being used.

Traditional machine classifiers review a sample data set that has been pre-classified to generate a set of classification rules which they can then use to classify the full data set. However, imagine that the sample data set was pre-classified by two human coders, one who was very skilled with over 10 years of experience and one who had never done a coding project before. If the machine classifier encountered a particular unit of data where the skilled coder coded it one way and the new coder coded it a different way, the machine classifier would not be able to determine which coder has correctly coded the item of data. It would be a great benefit if the machine classifier was provided information on the coders so that the machine classifier knew which category was selected by the skilled coder when it was generating the classification rules. In addition, it would also be beneficial if the coder's skill level or reputation was known before coders were selected for a project.

Thus, the systems and methods discussed herein disclose an enhanced machine learning ("EML") system which integrates the use of the classification data for a target data set, sometimes referred to as a sample data set, along with data about the coders who have coded the data. In particular, the EML system trains the machine classifier using the classification data in conjunction with coder ranking data, which indicates an expected accuracy level for each coder who classified data in the sample data set. By incorporating information on the coder who classified the data, the efficiency, accuracy, reliability, and/or validity of the data classification is greatly improved. In addition, the systems and methods disclose selecting coders for a project based on the coder ranking data.

I. Overview

In one embodiment, the EML system allows a requesting entity to quickly and more accurately categorize large data sets. To begin the process, a full data set is selected for classification by the EML system. This data set may include publicly available data, privately accessed data, as well as a combination of the two. Categories are created for the full data set and a set of human coders ("coders") are selected to code a sample set of data by reviewing their assigned subset of the sample data and selecting a category for each unit of data. Once the coders have finished their coding, one or more human adjudicators ("adjudicators") are selected to go through at least a subset of the coded data and selected a category for each unit of data. The data coded by the adjudicator(s) is then compared with the data coded by the coders to rank or score the coders based on the accuracy of their coding. The more similar a coder's codes are to the adjudicator's codes, then the coder is considered to be more accurate and is assigned a better score. The less similar a coder's codes are to the adjudicator's codes, then the coder is considered to be less accurate and is assigned a poorer score. In addition to the comparison to the adjudicator, a coder's score may also take into account the coder's ranking as compared to other coders, the coder's credentials, accreditation, peer trust score, previous control data set performances, third party evaluations, or other information about the coder.

The EML system then trains the machine classifier using the coded data, the adjudicated data, and the coder ranking data to create classification rules for the full data set such that the weight attributed by the EML system to the coder's selected codes varies depending on the coder's ranking data. The EML system can then utilize the classification rules to automatically classify the full data set.

II. Enhanced Machine Learning System

FIG. 1 illustrates one embodiment of an enhanced machine learning system ("EML system") 100 in communication with a requesting entity 1020, third party data sources 1030, an adjudicator system 1040, a coder system 1050, and data set sources 1060 via a network 1000. A requesting entity 1020 may send a request to the EML system 100 to code a data set stored in 1060. Coders then code the data from their respective coder systems 1050, and adjudicators adjudicate the coded data using their respective adjudicator systems 1040. The EML system 100 may then use information from the coded data and the adjudicated data to rank or score the coders. The EML system 100 may also use data from third party sources 1030 in the ranking or scoring.

In one embodiment, the EML system 100 includes a ranking module 101, a classification module 102, coders data 103, adjudicators data 104, and analyzed data 105.

A. Ranking Module

The ranking module 101 is used to rank or score human coders. Coders may be users that perform data coding for different data classification projects. A coder may receive the title of "skilled coder" when that coder is ranked highly in comparison with other ranked coders or receives numerous endorsements from other skilled coders. For example, a coder ranked in the top 10% as compared with other classifiers may receive the "skilled coder" title. In one embodiment, the coder ranking may be further broken down into skill levels, such as novice, intermediate, or expert coder. A coder may also receive recognition as a skilled coder generalist after obtaining high rankings in multiple categories. Coders may be selected by the coder system 1050 to perform data coding based on their ranking or score.

In some embodiments, the ranking module 101 may store information about each coder's their expertise or skill in certain subject areas or project types. Coders might be allowed universal participation in all subject areas or project types if they have reached a certain ranking or trust score over a period of time. The ranking module 101 may incorporate different parameters to determine a coder's ranking. For example, a peer trust score may be determined by evidence or indications of trust from other coders and peers in the system. The most trusted members of a classification community are able to assert more influence when new classifiers seek to be validated as trustworthy. In some embodiments, a first coder may request to be labeled as a peer of a second user by establishing a peer connection with the second coder. The first coder can then flag the second user as "trustworthy" by indicating to the ranking module 101 that the second user is being endorsed by the first peer. In some embodiments, this system may operate similarly to the "like" event in certain social networking platforms (for example, Facebook). The indication for the second user may be combined with previous trust endorsements from other peers and peer connections aside from the first peer, and the accumulated trust scores of the second user. In addition to this accumulation of scores, the first peer's trust endorsement and previous trust endorsements may be weighted to generate a new classifier trust score for the second user.

The coder's ranking or score may be represented in a variety of formats. A coder may be ranked or scored using numbers (for example, "1, 2, 3, 4 . . . "), letters (for example, "A, B. C, D, . . . "), words (for example, "expert, advanced, standard, learning . . . "), a symbol (for example, <+++, ++, +, −, −−, . . . "). In addition, more abstract representations may be used, such as an icon that ranges from a smile to a frown, number of stars or degrees of moon fullness. It is also recognized that the values may range from low-to-high and/or from high to low and can be rendered as gauges, thermometers, speedometers and other meters, as well as in common chart formats such as pie charts, bar charts and sliders.

B. Classification Module

The classification module 102 can receive a request from a requesting entity 1020 to engage in data classification of a set of raw data. The requesting entity 1020 can be a business or individual that wishes to quickly and efficiency analyze a set of its data or third party data. For example, the requesting entity 1020 can be a social media entity, government agency, interest group, university, corporation, or individual researcher. In some embodiments, the raw data sets may be retrieved from third party data sources 1030. These third party data sources 1030 can be public sources, including such as news feeds, social media data (for example, Tweets or Facebook postings), or internet forums. The requesting entity 1020 can also choose to provide the EML system 100 with its own raw data set stored in data set sources 1060 for data classification.

The classification module 102 assigns appropriate and skilled coders for a data classification project to generate coding data for a selected data set. The coder may be selected based on a ranking, trust score, credentials, accreditation, peer trust score, previous control data set performances, third party evaluations or other coder information. Once the classification module 102 has assigned one or more coders to a project, the EML system 100 establishes a training data set, sometimes referred to as a sample data set, from the full data set which the coders will code.

The classification module 102 assigns one or more appropriate and skilled adjudicators to adjudicate one or more coders' selected codes. The adjudicator may be selected based on a ranking, trust score, credentials, accreditation, peer trust score, previous control data set performances, third party evaluations or other adjudicator information. In some embodiments, a user may be selected as the adjudicator for a specific data classification project and given administrative permissions to adjudicate that project. In other embodiments, the classification module 102 selects an adjudicator from a database of coders or prior adjudicators. In the embodiments where a coder is selected, the coder may be a "master coder" who has achieved a level of expertise in the area or obtained a high ranking for general coding abilities.

The classification module 102 uses the analyzed and coded data 105, the coders data 103, and the adjudicators data 104 to create classification rules that can later be applied to the full data set. This allows the classification module 102 to convert human coding judgments into more accurate machine classification rules for text analytics. These classification rules are then applied to the full data set. The final analysis of the data may then be displayed to the requesting entity in a report.

C. Data Sets

The coders data 103 stores information related to coders that code data for the EML system 100. This information can include each coder's personal information, ranking, trust score, credentials, accreditation, peer trust score, previous control data set performances, third party evaluations, or other coder information. This information may be accessed by the EML system 100 to determine whether a coder should be selected for a classification project and for scoring/ranking the coder.

The adjudicators data 104 stores information related to each adjudicator that is utilized by the EML system 100 in adjudicating selected codes. This information can include each adjudicator's personal information, ranking, trust score, credentials, accreditation, peer trust score, previous control data set performances, third party evaluations, or other adjudicator information. This information may be accessed by the EML system 100 to determine whether an adjudicator should be selected for a classification project and for scoring/ranking the adjudicator.

The analyzed data 105 stores information from previous and ongoing EML system 100 classification projects. The user of the EML system 100 may access the analyzed data 105 to retrieve information about past projects or current projects. In some embodiments, the analyzed data 105 may also be accessed to determine the quality of classification projects based on comparisons with future projects or feedback from requesting entities.

III. Enhanced Machine Learning Process

In some embodiments, the EML system 100 includes several EML processes which allow the EML system 100 to perform data classification in a variety of settings. As one example, a social media company may use the EML system 100 to identify trending subject matter within data posted by the social media community. The EML system 100 can review data posted by users over a period of time to identify the most popular topics or to understand how the users are viewing a particular issue (for example, whether a celebrity's recent incident is being criticized or praised in the public, whether a particular product is being discussed, whether a newly released video game is popular, whether a political candidate is favored or disfavored, and so forth). As another example, the EML system 100 may be used to identify and classify documents in legal electronic discovery processes (for example, categorizing electronic documents within issue categories, flagging potentially privileged documents, designating documents as potentially containing third party confidential information, and so forth). The EML system 100 could also be used by a human resources department to classify large set of emails to identify potentially problematic emails (for example, emails that contain improper content, outgoing emails that may include proprietary company information, emails that may include threatening subject matter, and so forth). It is recognized that the EML system's 100 classification processes may be used in a variety of contexts.

In one embodiment, data classification begins when the EML system 100 retrieves or accesses a data set for a project from data set sources 1060 or third party data sources 1030. Multiple data sets may be retrieved at once, in batches, and/or in real time. In some embodiments, the data sets include "unstructured" or "non-structured data," meaning that these data sets are not well-defined (for example, they do not have a pre-defined data model or they do not fit well into relationship tables or they are only semi-structured). Examples of unstructured data may include books, journals, documents, metadata, health records, audio, video, files, social media, Facebook, G+, Twitter, blogs, news, or public comments. Unstructured data may also include unstructured text, such as that from the body of an e-mail message, web page, or word document. The data sets could also include non-text data, such as images, video, multimedia, and so forth.

After accessing at least a portion of the data set, the EML system 100 may then determine categories to be used for the data set. The term "category" describes a particular class of subject matter for a data set. In some embodiments, the category of the data may be any class that would have sufficient breadth to allow classification of the data into at least two data sets. For example, the category may selected from various topics including, but not limited to, sentiment, location, economic status, behavioral propensities, and necessity of intervention. The category may also be based on a specific field of study, such as social media, engineering, law, or medicine.

After the categories are determined for a project, coders can code a subset of the data and adjudicators can adjudicate the coded data. The EML system can then uses the coded data, the adjudicated data, and coder ranking data to create classification rules. It is recognized that in some embodiments, the coding or adjudicating of the data may be conducted by other systems.

The EML system may then engage one or more machine classifiers depending on the number of classifiers requested by the requesting entity 1020, the complexity of the data set, or the time deadline for the project. Each of the machine classifiers and may be run in parallel to apply learned classification rules to their respective data sets and automatically classify their data into one set or another, which can also be referred to as conducting text analytics, data mining, labeling, tagging, and/or classifying.

Data classification via the EML system 100 may be implemented by online software or offline software. In some embodiments, the software includes an online application (for example, a web-based application or a cloud-based application) an offline application (for example, Software as a Service), or a combination of the two.

A. Data Classification Process

Figure 2:
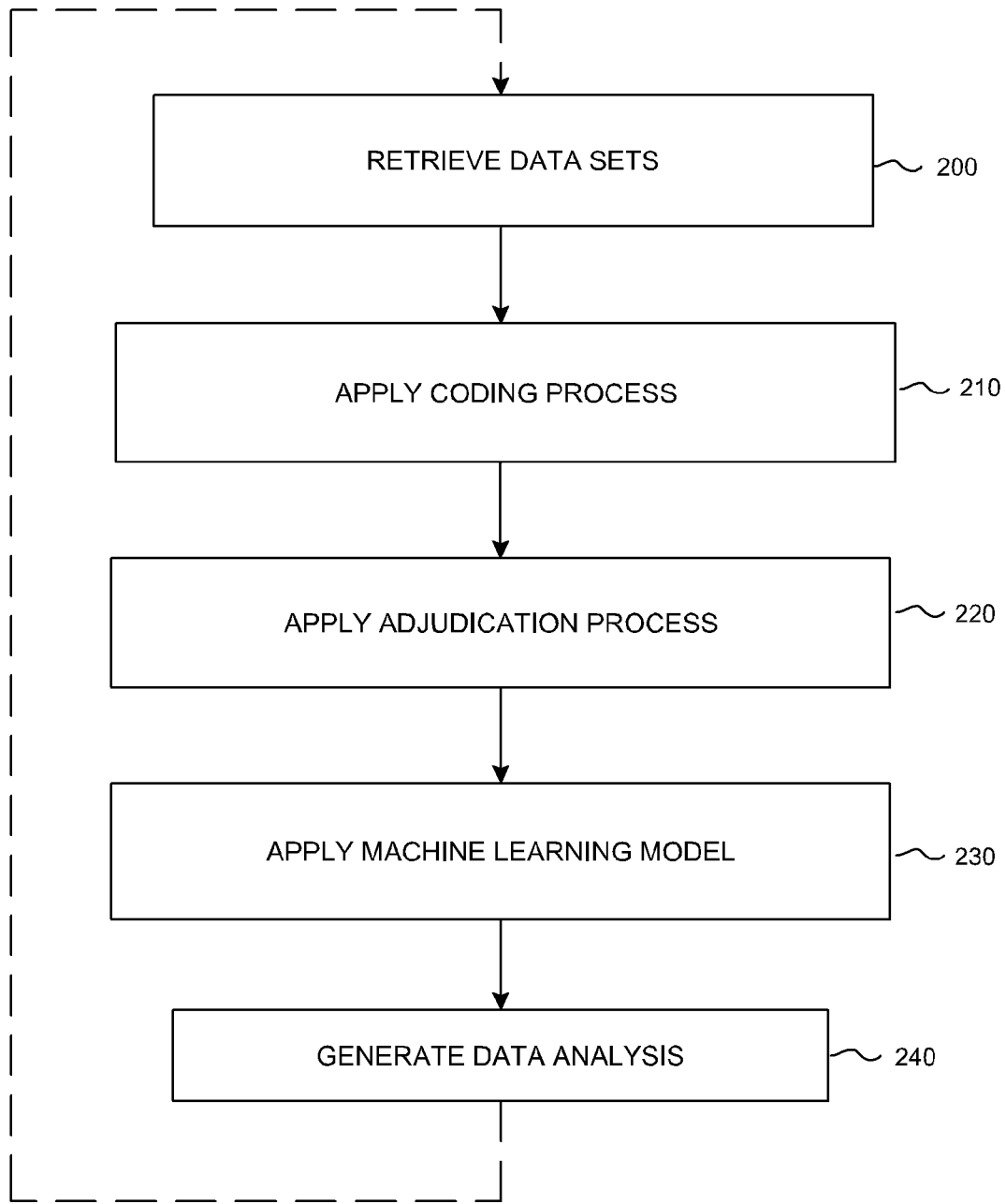
FIG. 2 is a flow chart illustrating one embodiment of a method of applying an enhanced machine learning system.

FIG. 2 is a flow chart illustrating one embodiment of a data classification method, which can be implemented or controlled in whole or in part by the EML system 100. In block 200, the EML system 100 retrieves or access data sets from the data set sources 1060 or third party data sources 1030. The data set may also be provided by the requesting entity 1020.

At block 210, the EML system 100 applies a human coding process to a subset of the full data set, sometimes referred to as a sample data set, in which human coders interact with the EML system 100 to access their respective subsets of data. For example, the full data set may include 10,560 different data units and the sample data set may include 90 units. The ELM system 100 may select human coders for a project based upon the coder's previous ranking, trust score, credentials, accreditation, or expertise with a particular type of data or subject matter. For example, a coder familiar with the subject of behavior propensity could be assigned to a data set that includes behavioral data. The selected coders can be asked to code the same set of data, mutually exclusive sets of data, or overlapping sets of data. For example, two of the coders may be asked to code the same set of data, a third coder may be asked to code a completely separate set of data, and a fourth coder may be asked to code data that overlaps with the first two coders and the third coder. Once selected, the coders are presented instructions on how to code their data sets and access an electronic user interface, provided by the EML system 100 or other system, to categorize the data set and submit the categorization data to the EML system 100.

At block 220, the EML system 100 applies an adjudication process to at least a portion of the sample data set in which human adjudicators interact with the EML system 1000 to access their respective subsets of data. The EML system 100 may select one or more human adjudicators for a project based upon the adjudicators' previous ranking, trust score, credentials, accreditation, or expertise with a particular type of data or subject matter. In some embodiments, the adjudicators may include master coders or very skilled coders. The selected adjudicators can be asked to code the same set of data, mutually exclusive sets of data, or overlapping sets of data. For example, one of the adjudicators may be asked to code a first set of data, a second adjudicator may be asked to code a completely separate set of data, and a third adjudicator may be asked to code data that overlaps with the first and second adjudicators. Once selected, the adjudicator may be presented instructions on how to adjudicate his or her data set and access an electronic user interface provided by the EML system 100 or other system to adjudicate the portion of the sample data set and submit the adjudication data to the EML system 100. In other embodiments, an adjudicator or other entity may pre-code a portion of the sample data set to create a control data set with known categorizations. In some embodiments, the control data sets may be externally produced and serve as the "gold standard" data set.

If there is only one adjudicator who has adjudicated a data set, the EML system 100 may consider the categories reflected in the adjudicated data to be the properly coded data set with all of the "correct" categories. In other embodiments, the adjudication process may include reviewing multiple adjudicators' analyses to determine the "correct" category by selecting, for example, the category that was selected by a majority of the adjudicators or by weighing category selection by the adjudicators' ranking or score and then determining which category gained the highest score. In other embodiments, the adjudication process may also include reviewing coders' analyses with the adjudicated data or the control data sets to determine the "correct" category for each data unit in the adjudicated data or the control data sets. The coder ranking, number of coders, as well as the adjudicators' categorization may be considered in the comparison. For example, if there were 10 coders and 8 "very skilled" coders selected Category A for an unit of data, but the only adjudicator selected Category B for the same unit of data, then Category A may be selected as the correct category. However, if 8 "moderately skilled" coders selected Category A for an of data, but 2 adjudicators selected Category B for the same data unit, then Category B may be selected as the correct category. It is recognized that a variety of scenarios could be applied to determine the correct category and that scenarios could be customized for each project, each requesting entity, or each EML system 100.

In block 230, a machine classifier is trained using the adjudicated data and the coded data to create classification rules for a machine learning model based on the categorizations selected in the training data sets. As discussed further herein, the machine learning model may be generated by factoring in ranking data for the coders or adjudicators that provided the coded data or the adjudicated data. The machine learning model is then applied to the full data set or a portion of the data set beyond the sample data set to automatically classify the selected data based on the classification rules and to store the classifications.

In block 240, the EML system 100 generates a data analysis report that provides information on the categories selected for the data. At the end of block 240, the EML system 100 may repeat the data classification process by returning to block 200.

B. Coder Ranking Process

Figure 3:
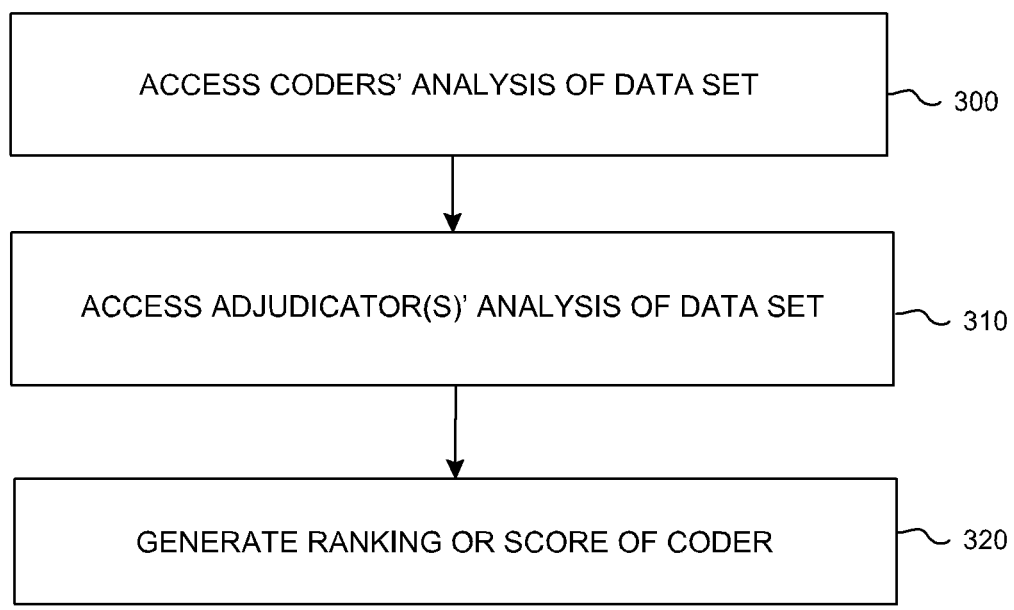
FIG. 3 is a flow chart illustrating one embodiment of a method of ranking coders.

FIG. 3 is a flow chart illustrating one embodiment of a method of ranking coders or adjudicators, which can be implemented or controlled in whole or in part by the EML system 100.

In block 300, the EML system 100 accesses the coders' analyses of their subset of data, which include the categories assigned to the data units. The coding may be performed by coders directly or remotely accessing the EML system 100 or by coders utilizing a different system. Thus, the coded data may be retrieved from a storage location in the EML system 100 or another system. In block 310, the EML system 100 retrieves the adjudicators' analyses of the data set, which include the categories the adjudicators assigned to the data units or the control data which represents the properly coded data set with all of the "correct" categories. The adjudication may be performed by adjudicators directly or remotely accessing the EML system 100 or by adjudicators utilizing a different system. Thus, the adjudicated data or control data may be retrieved from a storage location in the EML system 100 or another system. This data may also be retrieved from memory in the EML system 100 or another storage location.

In block 320, the EML system 100 compares the coders' and adjudicators' selected categories with the "correct" set of categories to analyze and quantify the skill level of the coders and adjudicators. The more similar a coder's or an adjudicator's codes are to the correct codes, then the coder or adjudicator is considered to be more accurate and is assigned a better score. The less similar a coder's or an adjudicator's codes are to the correct codes, then the coder or adjudicator is considered to be less accurate and is assigned a poorer score. In addition to the comparison to the correct codes for the corresponding project, a score, sometimes referred to as a ranking, may also take into account other factors such as, for example, the accuracy of coding mock data sets or control data sets, an indication of high quality coding work by a third party, an accumulation of high scores via adjudication on other projects, in a particular domain or over a time and across several domains, the correspondence of individual coding choice with other high scoring coders or adjudicators, as well as weighted or non-weighted input from other users or peers who have indicated "trust" or "distrust" in a particular coder or adjudicator. Thus, in some embodiments, a score calculation may be based solely on the accuracy of coding of the coder's or adjudicator's data set as compared with the correct codes, while in other embodiments, the score is only partially based on coding accuracy.

The score may also reflect other factors that are not directly related to the coding, such as, for example, the coder's or adjudicator's credentials, accreditation, online activity, self-assessment, web page content, email domains (for example, higher score for and .edu or .gov domain versus a google.com or yahoo.com domain), profile (for example, LinkedIn or Facebook), reputation scores (for example, Klout score), number of followers (for example, follower accounts on Twitter, number of connections or recommendations on LinkedIn, number of friends on Facebook), educational background, work experience, volunteer experience, general knowledge, expert field, an measurement of the degree that other users trust the user to provide high quality work, and so forth. The calculation of the score may also take into account generated automated topic detection based on the types of and content in documents or data the user has previously coded. Accordingly, a coder may have a very low score as a general coder, but have a very high score for coding data pertaining to hazardous material. While the term "score" is used herein, it is recognized that the term score may include scores, rankings, assessments, and other analyses which provide data that assists in quantifying the expected accuracy of the coder or adjudicator.

The calculation of the score may weigh one or more of these considerations heavier (or only consider them at all) if they are validated, credited, confirmed, or otherwise reviewed by third parties. A third party system may establish that a coder or an adjudicator has one or more accounts on third party systems (for example, a coder has an email address at an education institution or a user can use online exams to create an account to validate that they have specific domain knowledge). The third party systems may confirm that they have reviewed records of the coder's or adjudicator's credentials and accreditations. In addition, the third party systems may have the ability to verify or validate a user's credentials and accreditations. Such validated credentials may be used to increase a score if the credentials include specifics into which domain(s) the coder or adjudicator is credentialed. Credentials that have been verified may establish that the coder is (a) authentic and (b) knowledgeable in various subjects and topics. As such, verified/validated credentials may contribute to the person's corresponding score.

Given that the score can be based on a coder's or adjudicator's activity, a score can be updated (in a positive or negative manner), such as by feedback from verified and accredited classifiers or additional accurate coding. In some embodiments, a coder or adjudicator can also change his or her score by participating in coding of control data sets, engaging in coding "games" or "puzzles," as well as working to improve one or more of the other factors that are not directly related to coding as discussed above. In one embodiment, increasing the database of ranked or high scoring coders may involve providing incentives for classifiers to improve their rankings. For example, a project manager may offer gift cards to the three best coders for a project. In some embodiments, incentives may be purchase or automatically fulfilled upon completion of a data classification project.

It is recognized that the score calculation may be based on one or more other scores. For example, one score may reflect the accuracy of the coder's or adjudicator's classification of data on one or more projects, sometimes referred to as a trust score, whereas a second score may reflect the online reputation of the coder or adjudicator, sometimes referred to as a knowledge score. However, it is recognized that a single score may be used or that a set of multiple scores may be used with varying weights given to the multiple factors and/or sub-scores. For example, if a coder assesses other coders, his or her own trust score and knowledge score may be taken into account such that a peer assessment provided by a higher ranked coder is given more weight than a peer assessment given by lower ranked coder.

The EML system 100 may then store the score(s) and related information about the coders in the coders data 103 and the adjudicators in the adjudicators data 104. The information may include the breakdown of how each coder or adjudicator performed in the data classification process as well as their corresponding rankings or trust scores.

C. Data Classification Process Using Coder Ranking

Figure 4:
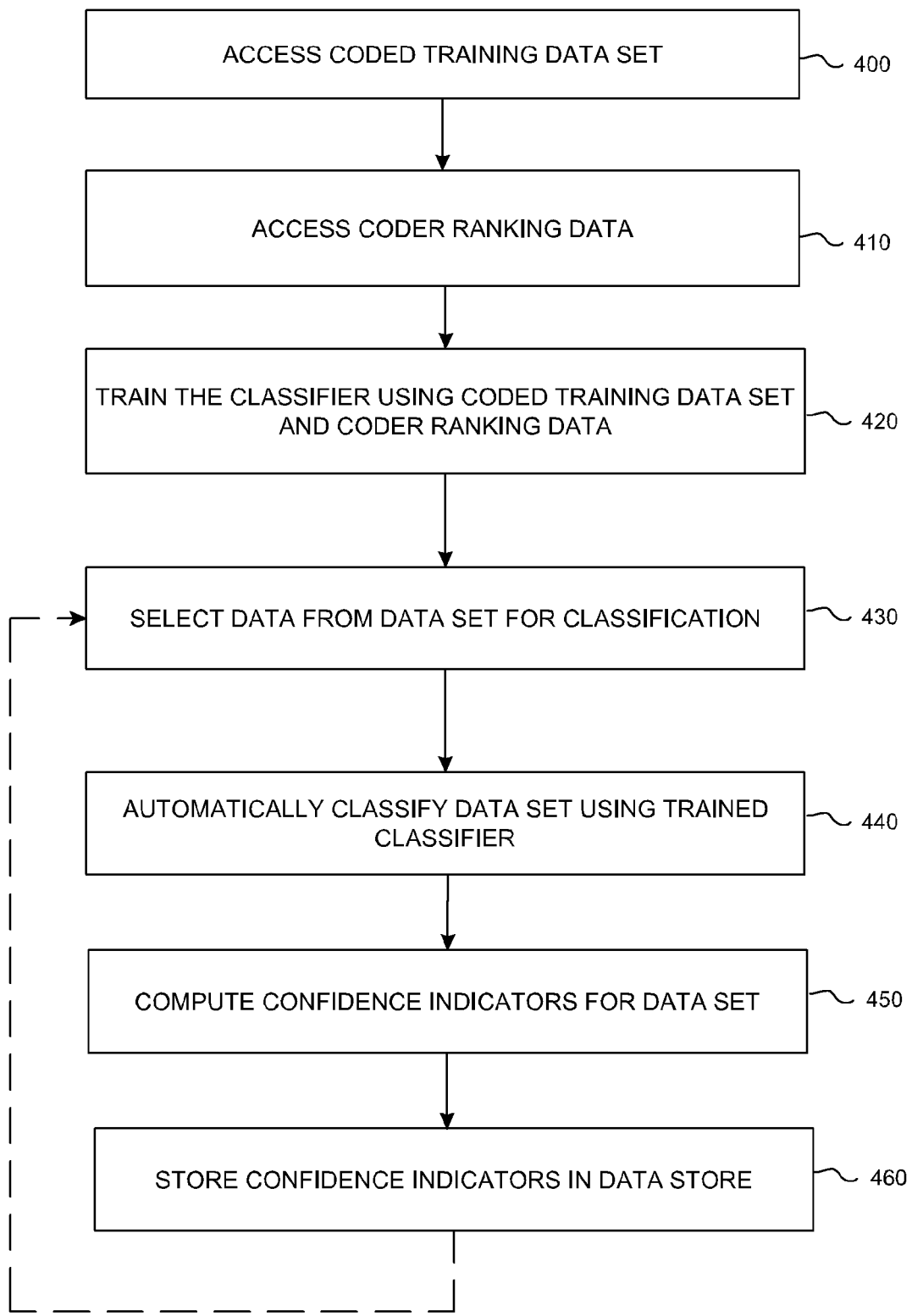
FIG. 4 is a flow chart illustrating one embodiment of a method of performing enhanced machine learning to classify a data set.

FIG. 4 is a flow chart illustrating one embodiment of a method of generating a classification score of a data set. In block 400, the EML system 100 accesses coded training data sets or sample data sets coded by one or more coders. These data sets can be stored in analyzed data 105 or in a separate data store. In block 410, the EML system 100 accesses coder ranking data from the coders data 103. The coder ranking data can be stored in coders data 103 or in a separate store and is based on information generated by the ranking module 101. In block 420, the machine classifier is trained using the coded training data set and coder ranking data and can generate a set of classification rules. In some embodiments, if a coder's selected category does not match the "correct" answer, the coder's data for that unit is discarded and not used in the generation of the classification rules or training. However, it is recognized that in other embodiments, the coder's data for that unit may be included in generating the rules and the training, such as, for example, by weighing it low, only including it if several other coders also selected the same category, and so forth.

In block 430, the EML system 100 selects a set of data for classification. The set of data may be the full set of data for the project or a subset of the data, but typically includes data that is not already coded in the coded training data sets. This set of data can be selected by the requesting entity 1020 for evaluation purposes prior to completing data classification for an entire data set or selected by the ELM system (for example, the first 250 data units, 25% random sampling of the data units, and so forth). In block 440, the trained machine classifier automatically classifies the selected data by applying the set of classification rules.

In block 450, the EML system 100 computes confidence indicators for the classified data set. These indicators may be based on the accumulation of rankings or scores of coders or adjudicators who participated in analyzing the coded training data set. Other factors, such as the coder's and adjudicator's actual coding analysis, adjudication coding results, peer trust score, credentials, accreditation, trust score, knowledge score, comparison to other similar data units, or assigned expert category score by also be taken into consideration. These factors may be preset by the EML system 100 and adjusted based on the particular data classification project. It is recognized that multiple methods to compute and assign weightings and scores may be practiced by the EML system 100. For example, support vector machines, a probability network based on Dempster-Shafer theory, or a binary system may be used to generate the final weightings and scores applied to a data unit.

In block 460, the confidence indicators are stored in memory 1700 or analyzed data 105 and the process may be repeated from block 430 for any remaining data in the full data set.

IV. Example Classification Project

Figure 5:
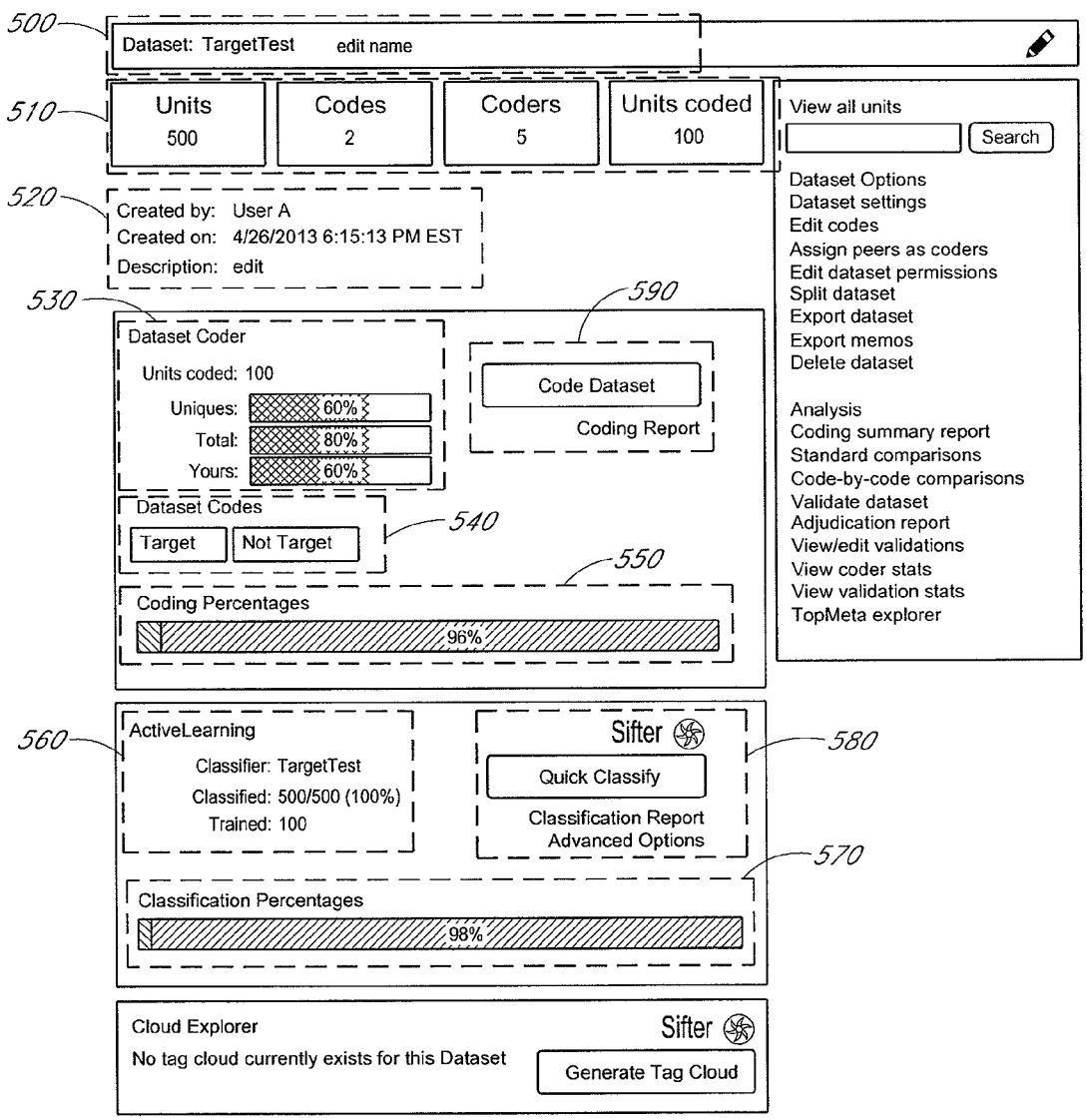
FIG. 5 is one embodiment of an illustrative webpage user interface that includes interface controls configured to receive information to create a data classification project.

FIG. 5 is one embodiment of an illustrative webpage user interface that may be generated by the EML system 100 that includes interface controls configured to receive information to create a data classification project. In the example illustrated in FIG. 5, the data classification process is categorizing data as being in either the "Target" or "not Target category." The "Target" category should include all data that mentions Target, the store. Any other references to the term "target" should be categorized as "not Target." In this example, there are 500 units that are available to be coded, two codes (target and not target), one coder, and 100 units that have been coded.

The dataset 500 displays the name of the project and may be edited by any project manager. In some embodiments, the project name is automatically generated once the requesting entity submits a project or entered by a user.

The overview 510 allows a classifier or project manager to see the total units of data, number of classification codes, number of coders on the project, and units coded. The project identifier 520 allows a coder or project manager to see who created the project, when it was created, and any additional descriptions associated with the project. The breakdown 530 of dataset classification between an individual coder and a group of coders allows each coder to see his or her progress in comparison with other coders. The dataset codes 540 show the classifications or categories for the project. The coding percentages 550 show how the data has been coded by percentage. The ActiveLearning area 560 allows the user to see which classifier information is displayed, how many units of data have been classified, and how many units of data have been used for training. Classification percentages 570 can show how the data set has been classified by percentage. The Sifter 580 allows the user to initiate the data classification process based off of classification rules. The user can also view a classification report generated by the final classification of the data set. The user can continue coding the dataset by pressing the code dataset 590 button and being redirected to the coding interface.

A. Coding

Figure 6:
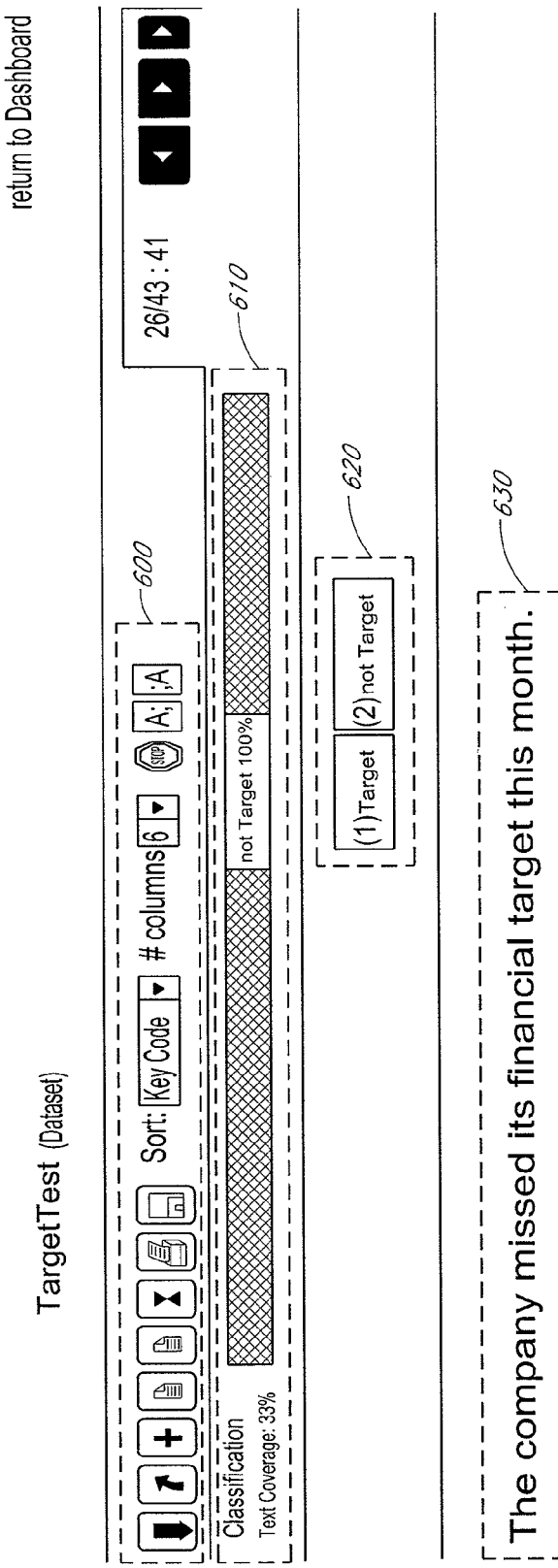
FIG. 6 is one embodiment of an illustrative webpage user interface that includes interface controls configured to receive information regarding coding of a data set.

FIG. 6 is one embodiment of an illustrative webpage user interface that may be generated by the EML system 100 that includes interface controls configured to receive information from a coder who is coding a data set. The toolbar 600 allows the coder to select different options in which to view the coding interface, such as print, save, copy, or paste. The classification bar 610 allows the coder to see how the displayed data 630 has been coded by all of the coders by percentage. The codes 620 give the user the option to select the category to which the displayed data 630 belongs. In this particular example, the data displayed should not be coded as "Target" because it is being used to mean a goal and is not referring to the store Target. 100% of the coders have coded this particular data unit as "not Target."

B. Adjudication

Figure 7:
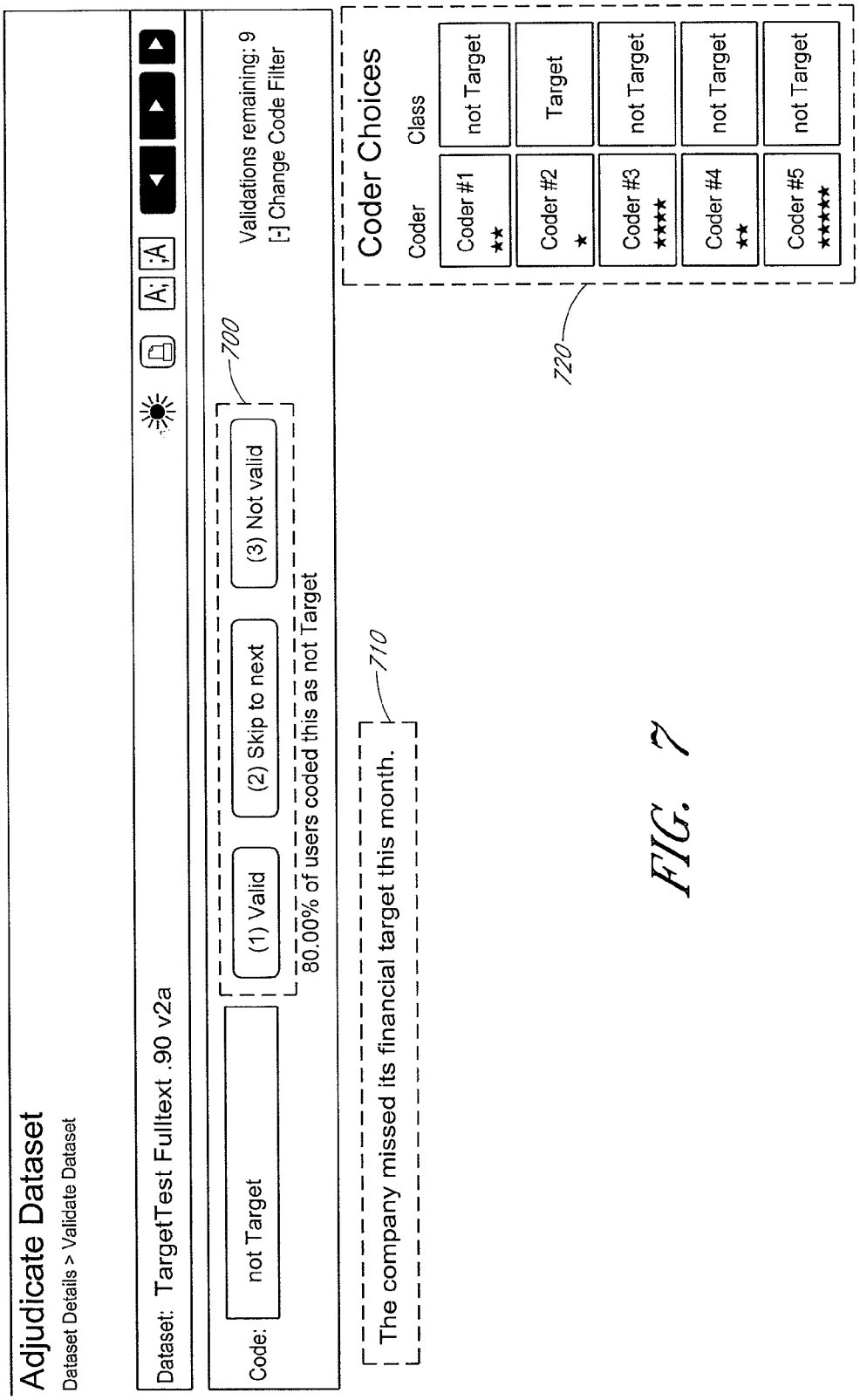
FIG. 7 is one embodiment of an illustrative webpage user interface that includes interface controls configured to receive information regarding adjudication of a data set.

FIG. 7 is one embodiment of an illustrative webpage user interface that may be generated by the EML system 100 that includes interface controls configured to receive information from an adjudicator who is adjudicating a data set. The adjudicator can look at the data unit within a data set and categorize it. In one embodiment, the adjudicator is presented the category selected by a group of coders (for example, the majority, at least half, and so forth). The adjudicator can then determine whether the code selected by a group of coders is correct. The adjudicator informs the EML system 100 about the selection by selecting whether it is "Valid," or "Not valid." The adjudicator also has the option of "Skip to next" to go to the next data unit. The coder choices 720 are displayed for the adjudicator to see which coders have coded that particular unit. Each coder's choice is displayed and their ranking is shown, for example, by the number of stars under their username. In this particular example, the adjudicator has chosen the data unit 710 to be under the "not Target" category. The only coder who did not agree with this coding was Coder #2. It can be seen that Coder #2 has a low ranking of only one star.

C. Coder Ranking—Coding and Adjudication Results

FIG. 8 is one embodiment of an illustrative webpage user interface that may be generated by the EML system 100 that includes a report depicting the validation results of the coders after their selected codes have been adjudicated. This chart 800 may be generated by the ranking module 101 once adjudication has been performed on each the coded data set. In some embodiments, the percentage displayed in this chart 800 may be used to determine a coder's ranking or trust score. In some embodiments, the coder's ranking or trust score may be dependent upon other or additional factors. For example, the coder's trust score, credentials, accreditation, or assigned expert category score may be incorporated into the coder's final ranking or trust score. The validations by class 810 show by category how often an adjudicator validated the corresponding category selection.

FIG. 9 is one embodiment of an illustrative webpage user interface that may be generated by the EML system 100 that includes the standard comparisons of an analyzed data set. The coder selected for a selected project may be displayed and compared with one another. In this particular embodiment, the current view 900 displays a comparison table of the coder who participated in data classification of the project.

The codes 910 display the categories of data which were used for analyzing the data set. The totals 920 show the adjudication results which demonstrate the reliability of each coder's analysis. The kappa column informs the classifier or project manager of the level of agreement across of the data set classification across all the classifiers. In this example, the score of 0.95 is a high agreement score and demonstrates that the classifiers agreed on the majority of data units being coded as "not Target" or "Target".

Figure 10:
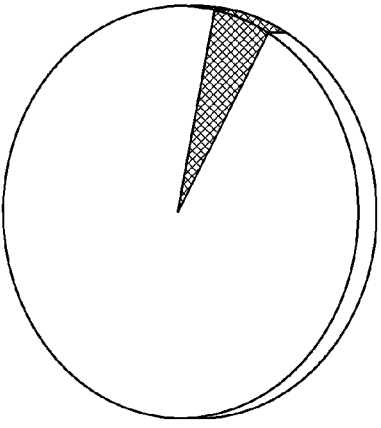
FIG. 10 is one embodiment of an illustrative webpage user interface that includes the report depicting the classification results of a data set.

FIG. 10 is one embodiment of an illustrative webpage user interface that may be generated at least in part by the EML system 100 that includes the report depicting the classification results of a data set. The report may be generated, for example, when the user selects the "Classification Report" button 580 in FIG. 5. The report includes a chart 1001 that displays the results of the data classification process. In some embodiments, the chart may be displayed as a bar graph, line graph, or other chart which shows information related to the data classification results. The legend 1002 allows the user to match the sections of the chart with the corresponding information. In this example, the 98% of the data units were classified as "not Target" and 2% were classified as "Target." Depending on the classification codes, these categories can change.

D. Classification Histogram

Figure 11:
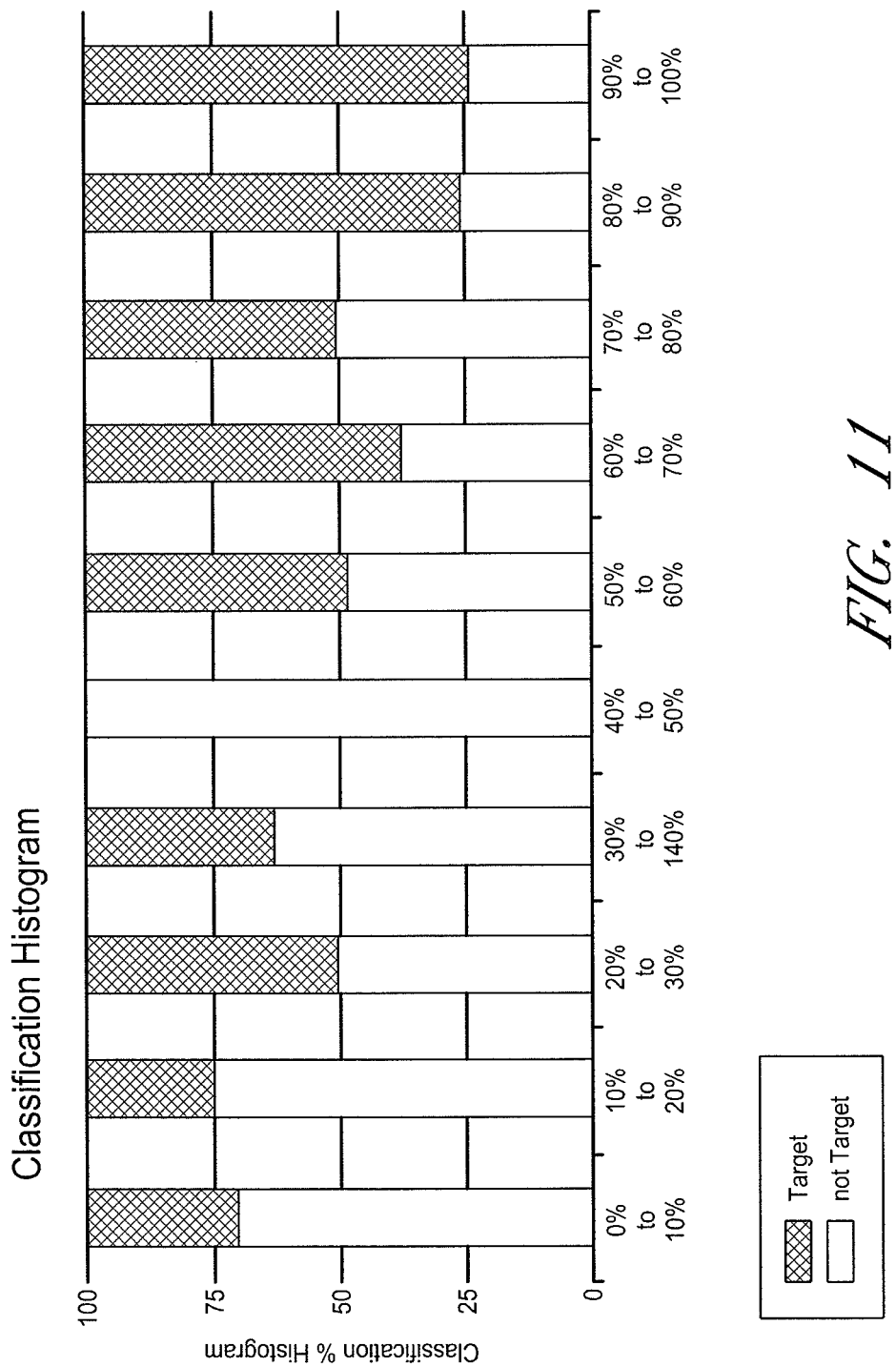
FIG. 11 is one embodiment of an illustrative webpage user interface that depicts results of a data classification on a classification histogram.

FIG. 11 is one embodiment of an illustrative webpage user interface that may be generated by the EML system 100 that depicts results of a data classification on a classification histogram. This classification histogram shows every data set unit has a score shown along the x-axis of 0 to 100. The y-axis shows the number of units which fall within the score range. In this example, approximately 24 documents in the 90-100% score range were classified as "Target" while approximately 76 documents in the 90-100% score range were classified as "not Target."

V. Computing System

Figure 12:
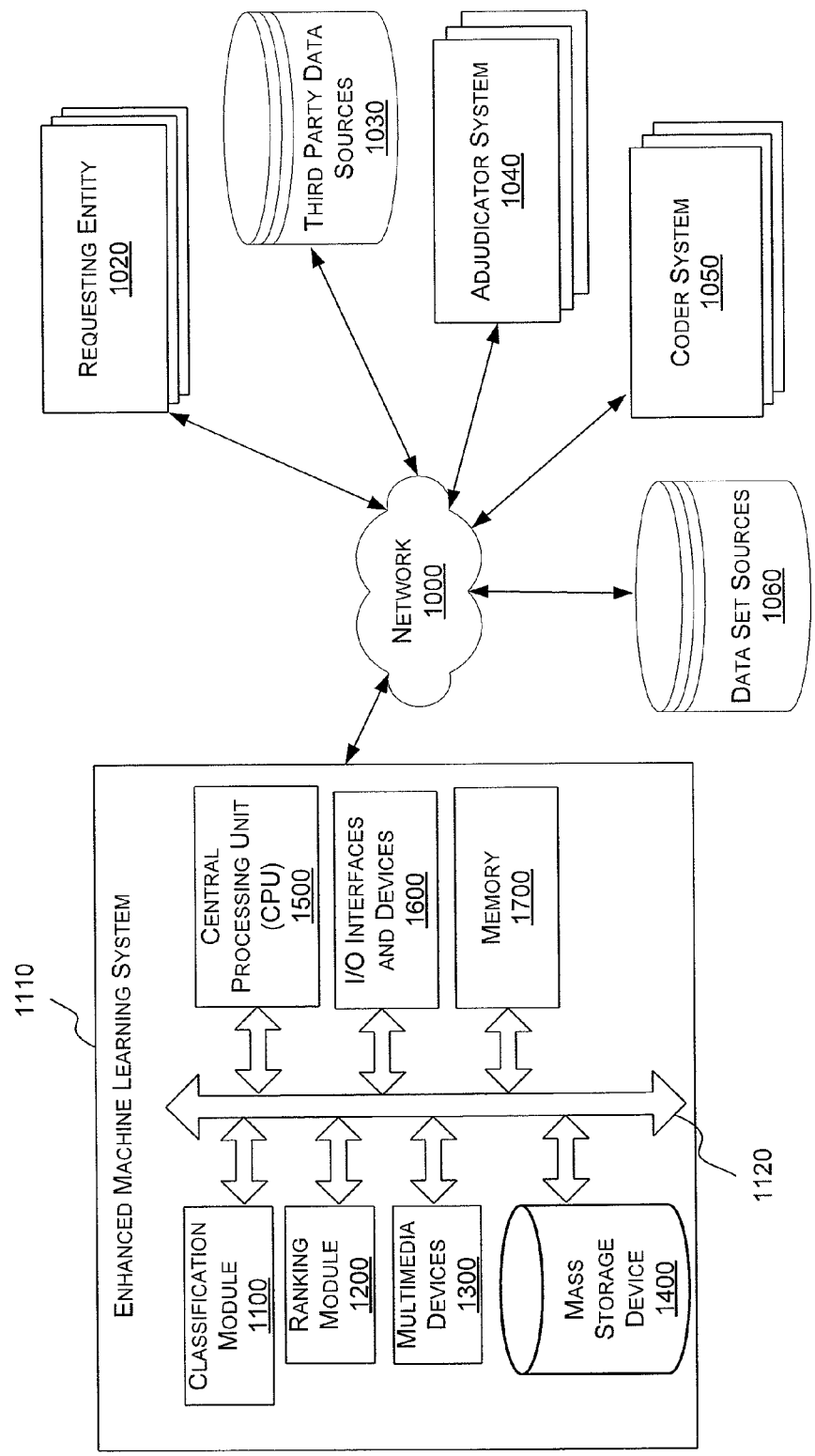
FIG. 12 is a block diagram illustrating one embodiment of an enhanced machine learning system in communication with a network and various systems which are also in communication with the network.

In some embodiments, the systems described herein take the form of a computing system as shown in FIG. 12. FIG. 12 is a block diagram showing an embodiment in which an EML system 1110 is in communication with various systems via a network 1000. The enhanced machine learning system 1110 also communicates via the network 1000 with third party data sources 1030 and data set sources 1060 to obtain and aggregate various data that can be used in the enhanced machine learning process. The EML system 1110 may store data sets, coder data, adjudication data, and classification data as part of the EML system 1110 via the network 1000. Thus, the EML system 1110 may be used to implement systems and methods described herein. In some embodiments, the EML system 1110 is accessed remotely by the requesting entity 1020, is local to the requesting entity 1020, or a combination of the two.

The EML system 1110 may be a computing system such as a personal computer that is IBM, Macintosh, or Linux/Unix compatible. In one embodiment, the computing system comprises a server, a workstation, a mainframe, a minicomputer, a personal computer, a laptop computer, a handheld device, a mobile phone, a smart phone, a personal digital assistant, a car system, or a tablet, for example. In one embodiment, the computing system includes a central processing unit ("CPU") 1500, which may include one or more conventional microprocessors that comprise hardware circuitry configured to read computer-executable instructions and to cause portions of the hardware circuitry to perform operations specifically defined by the circuitry. The computing system further includes a memory 1700, such as random access memory ("RAM") for temporary storage of information and a read only memory ("ROM") for permanent storage of information, which may store some or all of the computer-executable instructions prior to being communicated to the processor for execution, and a mass storage device 1400, such as a hard drive, diskette, CD-ROM drive, a DVD-ROM drive, or optical media storage device, that may store the computer-executable instructions for relatively long periods of time, including, for example, when the computer system is turned off. Typically, the modules of the computing system are connected using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system may be combined into fewer components and modules or further separated into additional components and modules.

The EML system 1110 is generally controlled and coordinated by operating system software, such as Windows 95, Windows 98, Windows NT, Windows 2000, Windows XP, Windows Vista, Windows 7, Windows 8, Unix, Linux, SunOS, Solaris, Maemeo, MeeGo, BlackBerry Tablet OS, Android, webOS, Sugar, Symbian OS, MAC OS X, or iOS or other operating systems. In other embodiments, the computing system may be controlled by a proprietary operating system. Conventional operating systems control and schedule computer processes for execution, perform memory management, provide file system, networking, I/O services, and provide a user interface, such as a graphical user interface ("GUI"), among other things.

The computing system includes one or more commonly available input/output ("I/O") devices and interfaces 1600, such as a keyboard, mouse, touchpad, speaker, microphone, or printer. In one embodiment, the I/O devices and interfaces 1600 include one or more display device, such as a touchscreen, display or monitor, which allows the visual presentation of data to a user. More particularly, a display device provides for the presentation of GUIs, application software data, and multimedia presentations, for example. The central processing unit 1500 may be in communication with a display device that is configured to perform some of the functions defined by the computer-executable instructions. For example, some of the computer-executable instructions may define the operation of displaying to a display device, an image that is like one of the screenshots included in this application. The computing system may also include one or more multimedia devices 1300, such as speakers, video cards, graphics accelerators, and microphones, for example. A skilled artisan would appreciate that, in light of this disclosure, a system including all hardware components, such as the central processing unit 1500, display device, memory 1700, and mass storage device 1400 that are necessary to perform the operations illustrated in this application, is within the scope of the disclosure.

In the embodiment of FIG. 12, the I/O devices and interfaces provide a communication interface to various external devices. In the embodiment of FIG. 12, the computing system is electronically coupled to a network 1000, which comprises one or more of a LAN, WAN, the Internet, or cloud computing networks, for example, via a wired, wireless, or combination of wired and wireless, communication link. The network 1000 communicates with various systems or other systems via wired or wireless communication links.

According to FIG. 12, information may be provided to the EML system 1110 over the network 1000 from one or more data sources including, for example, third party data sources 1030 or data set sources 1060. In addition to the systems that are illustrated in FIG. 12, the network 1000 may communicate with other data sources or other computing devices. The data sources may include one or more internal or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, or a record-based database.

In the embodiment of FIG. 12, the EML system 1110 also includes a classification module 1100 and ranking module 1200, which may both be executed by the CPU 1500. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, or variables.

In the embodiment shown in FIG. 12, the EML system 1110 is configured to execute the classification module 1100 and ranking module 1200, among others, in order to help provide enhanced machine learning, for example. In some embodiments, the classification module 1100 and ranking module 1200 may be configured to obtain or access third party data sources 1030 or data set sources 1060.

Embodiments can be implemented such that all functions illustrated herein are performed on a single device, while other embodiments can be implemented in a distributed environment in which the functions are collectively performed on two or more devices that are in communication with each other. Moreover, while the computing system has been used to describe one embodiment of an EML system 1110, it is recognized that the coder system and adjudicator system may be implemented as computing systems as well.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, or may be invoked in response to detected events or interrupts. Software instructions may be embedded in firmware, such as an EPROM. It will be further appreciated that hardware modules may be comprised of connected logic units, such as gates and flip-flops, or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is recognized that the term "remote" may include systems, data, objects, devices, components, or modules not stored locally, that are not accessible via the local bus. Thus, remote data may include a system which is physically stored in the same room and connected to the computing system via a network. In other situations, a remote device may also be located in a separate geographic area, such as, for example, in a different location, country, and so forth.

VI. Various Embodiments

All of the methods described herein may be embodied in, and partially or fully automated via, software code modules executed by one or more general purpose computers. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

In addition, embodiments may be implemented as computer-executable instructions stored in one or more tangible computer storage media. As will be appreciated by a person of ordinary skill in the art, such computer-executable instructions stored in tangible computer storage media define specific functions to be performed by computer hardware such as computer processors. In general, in such an implementation, the computer-executable instructions are loaded into memory accessible by at least one computer processor. The at least one computer processor then executes the instructions, causing computer hardware to perform the specific functions defined by the computer-executable instructions. As will be appreciated by a person of ordinary skill in the art, computer execution of computer-executable instructions is equivalent to the performance of the same functions by electronic hardware that includes hardware circuits that are hardwired to perform the specific functions. As such, while embodiments illustrated herein are typically implemented as some combination of computer hardware and computer-executable instructions, the embodiments illustrated herein could also be implemented as one or more electronic circuits hardwired to perform the specific functions illustrated herein.

The embodiments illustrated herein are illustrative rather than limiting. The invention is not limited to cover only the embodiments explicitly illustrated herein. Rather, a person of ordinary skill in the art will appreciate, in light of this disclosure, that the various embodiments illustrate various features that can be mixed and matched by a skilled artisan in order to design a system with the particular feature set desired by the skilled artisan. All novel and non-obvious inventions that would be apparent to a person of ordinary skill in the art in light of this disclosure are within the scope of the subject matter that may be claimed in subsequent non-provisional applications. The various features, tools, systems and methods described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. In addition, the term "or" is sometimes used in its inclusive sense (and not in its exclusive sense) so that when used, the term "or" means one, some, or all of the elements in the list.

What is claimed is:

1. A system for enhanced machine learning using coder rankings, the system comprising:
    a first physical memory device configured to store a plurality of data sets including a first data set corresponding to a first subject area category, each of the plurality of data sets including at least one training data set;
    a second physical memory device configured to store coder data related to users who perform data coding;
    a classification computer processor module in electronic communication with the first and second physical memory device, the classification computer processor module configured to:
        store a first set of selected codes corresponding to a set of data items in a training data set of the first data set, the first set of selected codes provided by a first user via a first classifier system;
        store a second set of selected codes corresponding to the set of data items, the second set of selected codes provided by a second user via a second classifier system, wherein the first set of selected codes is different from the second set of selected codes; and
        electronically access an adjudicated set of selected codes adjudicated by a third user via an adjudication system; and
    a coder ranking processor module in electronic communication with the first and second physical memory device, the coder ranking processor module configured to:
        generate a first trust score corresponding to the first user as to the first subject area category, the first trust score based at least in part on:
            an accuracy determination of the first set of selected codes as compared to the adjudicated set of selected codes; and
            at least two or more of the following:
                an accuracy determination of previous coding performance by the first user from a prior time period;
                third party accreditation for the first user related to the first subject area category, or
                third party credentials for the first user related to the first subject area category;
        generate a second trust score corresponding to the second user as to the first subject area category, the second trust score based at least in part on:
            an accuracy determination of the second set of selected codes as compared to the adjudicated set of selected codes; and
            at least two or more of the following:
                an accuracy determination of previous coding performance by the second user from a prior time period;
                third party accreditation for the second user related to the first subject area category, or
                third party credentials for the second user related to the first subject area category;
        wherein the accuracy determination of the first set of selected codes indicates a level of accuracy higher than the accuracy determination of the second set of selected codes and the first trust score corresponding to the first user is higher than the second trust score corresponding to the second user; and
        store the first trust score and the second trust score in the second physical memory device.

2. The system of claim 1, wherein the classification computer processor module is further configured to:
    automatically generate data classification rules based at least in part on a subset of the first set of selected codes, a subset of second set of selected codes, the set of data items in the training data set, the first trust score, and the second trust score;
    automatically apply the data classification rules to the first data set; and
    generate a set of selected classification codes for the first data set.

3. The system of claim 2, wherein the first set of selected codes are given more weight than a second set of selected codes because of the first trust score being higher than the second trust score.

4. The system of claim 2, wherein the classification computer processor module is further configured to automatically generate a confidence indication for each of the generated classification codes.

5. The system of claim 2, wherein the classification computer processor module is further configured to automatically generate a final data analysis of the classified first data set.

6. The system of claim 1, wherein the first data set includes compilations of data from an entity requesting one or more of: text analytics or data mining.

7. The system of claim 1, wherein the first trust score is generated based also on one or more of the skill, knowledge, or experience of the first user.

8. The system of claim 1, wherein the first trust score is a numerical ranking based on the first user's coding accuracy in comparison to other users who perform data classification.

9. The system of claim 1, wherein the first trust score is a symbolic ranking based on the first user's coding accuracy in comparison to other users who perform data classification.

10. The system of claim 1, wherein the first trust score is a percentage based on the accuracy of the first set of classification codes as compared to a revised first set of classification codes.

11. The system of claim 1, wherein the first user is the same as the third user.

12. The system of claim 1, wherein the third user is different from the first user and the second user.

13. A computer-implemented method of enhanced machine learning using coder rankings, the method comprising:
    under control of one or more computing devices configured with specific computer executable instructions,
    storing a first set of selected codes corresponding to a set of data items in a training data set of a first data set corresponding to a first subject area category, the first set of selected codes provided by a first user via a first classifier system;
    storing a second set of selected codes corresponding to the set of data items, the second set of selected codes provided by a second user via a second classifier system, wherein the first set of selected codes is different from the second set of selected codes;

electronically accessing an adjudicated set of selected codes adjudicated by a third user via an adjudication system;
generating a first trust score corresponding to the first user as to the first subject area category, the first trust score based at least in part on:
an accuracy determination of the first set of selected codes as compared to the adjudicated set of selected codes; and
at least two or more of the following:
an accuracy determination of previous coding performance by the first user from a prior time period;
third party accreditation for the first user related to the first subject area category, or
third party credentials for the first user related to the first subject area category; and
generating a second trust score corresponding to the second user as to the first subject area category, the second trust score based at least in part on:
an accuracy determination of the second set of selected codes as compared to the adjudicated set of selected codes, and
at least two or more of the following:
an accuracy determination of previous coding performance by the second user from a prior time period;
third party accreditation for the second user related to the first subject area category, or
third party credentials for the second user related to the first subject area category;
wherein the accuracy determination of the first set of selected codes indicates a level of accuracy higher than the accuracy determination of the second set of selected codes and the first trust score corresponding to the first user is higher than the second trust score corresponding to the second user; and
storing the first trust score and the second trust score in a physical data store.

14. The method of claim 13, further comprising:
automatically generating data classification rules based at least in part on a subset of the first set of selected codes, a subset of second set of selected codes, the set of data items in the training data set, the first trust score, and the second trust score;
automatically applying the data classification rules to the first data set; and
generating a set of selected classification codes for the first data set.

15. The method of claim 14, wherein the first set of selected codes are given more weight than a second set of selected codes because of the first trust score being higher than the second trust score.

16. The method of claim 14, further comprising automatically generating a confidence indication for each of the generated classification codes.

17. The method of claim 13, wherein the first trust score is generated based also on one or more of the skill, knowledge, or experience of the first user.

18. The method of claim 13, wherein the first trust score is generated based also on one or more of the skill, knowledge, or experience of the first user with a specific category of data.

19. The method of claim 13, wherein the first trust score is generated based also on one or more of peer trust validation, third party accreditation, third party credentials, or an assigned expert category value.

20. Non-transitory computer storage having stored thereon a computer program that instructs a computer system to at least:
store a first set of selected codes corresponding to a set of data items in a training data set of a first data set corresponding to a first subject area category, the first set of selected codes provided by a first user via a first classifier system;
store a second set of selected codes corresponding to the set of data items, the second set of selected codes provided by a second user via a second classifier system, wherein the first set of selected codes is different from the second set of selected codes; and
electronically accessing an adjudicated set of selected codes adjudicated by a third user via an adjudication system; and
generate a first trust score corresponding to the first user as to the first subject area category, the first trust score based at least in part on:
an accuracy determination of the first set of selected codes as compared to the adjudicated set of selected codes; and at least two or more of the following:
an accuracy determination of previous coding performance by the first user from a prior time period;
third party accreditation for the first user related to the first subject area category, or
third party credentials for the first user related to the first subject area category;
generate a second trust score corresponding to the second user as to the first subject area category, the second trust score based at least in part on:
an accuracy determination of the second set of selected codes as compared to the adjudicated set of selected codes; and
at least two or more of the following:
an accuracy determination of previous coding performance by the second user from a prior time period;
third party accreditation for the second user related to the first subject area category, or
third party credentials for the second user related to the first subject area category;
wherein the accuracy determination of the first set of selected codes indicates a level of accuracy higher than the accuracy determination of the second set of selected codes and the first trust score corresponding to the first user is higher than the second trust score corresponding to the second user; and
store the first trust score and the second trust score in a physical data store.

21. The non-transitory computer storage of claim 20, wherein the computer program further instructs the computer system to:
automatically generate data classification rules based at least in part on a subset of the first set of selected codes, a subset of second set of selected codes, the set of data items in the training data set, the first trust score, and the second trust score;
automatically apply the data classification rules to the first data set; and
generate a set of selected classification codes for the first data set.

22. The non-transitory computer storage of claim 21, wherein the first set of selected codes are given more weight than a second set of selected codes because of the first trust score being higher than the second trust score.

23. The non-transitory computer storage of claim 21, wherein the computer program further instructs the computer system to automatically generate a confidence indication for each of the generated classification codes.

24. The non-transitory computer storage of claim 20, wherein the first trust score is generated based also on one or more of the skill, knowledge, or experience of the first user.

25. The non-transitory computer storage of claim 20, wherein the first trust score is generated based also on one or more of the skill, knowledge, or experience of the first user with a specific category of data.

26. The non-transitory computer storage of claim 20, wherein the first trust score is generated based also on one or more of peer trust validation, third party accreditation, third party credentials, or an assigned expert category value.

* * * * *